Nov. 15, 1938.       T. G. McDOUGAL            2,137,091
                        TUNNEL KILN
                    Filed Jan. 4, 1936          5 Sheets-Sheet 4
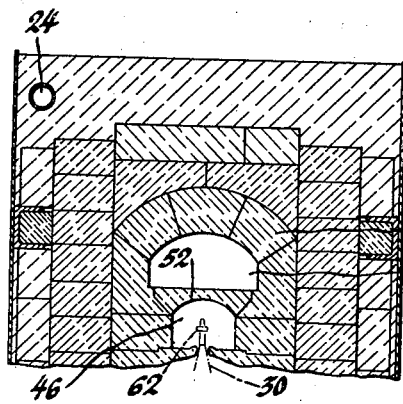
Fig. 3
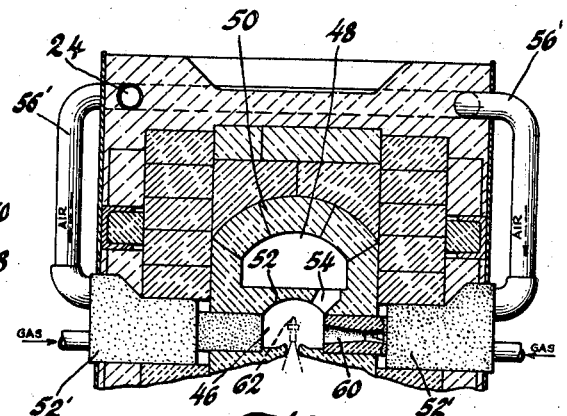
Fig. 4
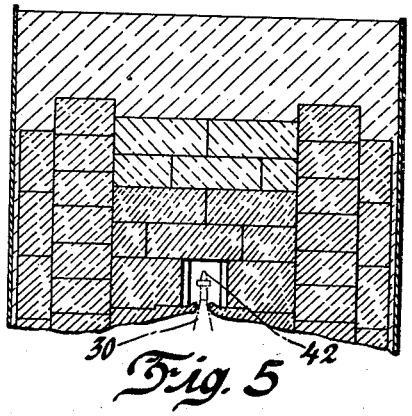
Fig. 5
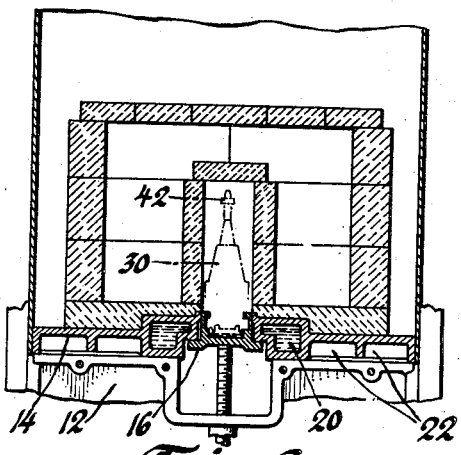
Fig. 6
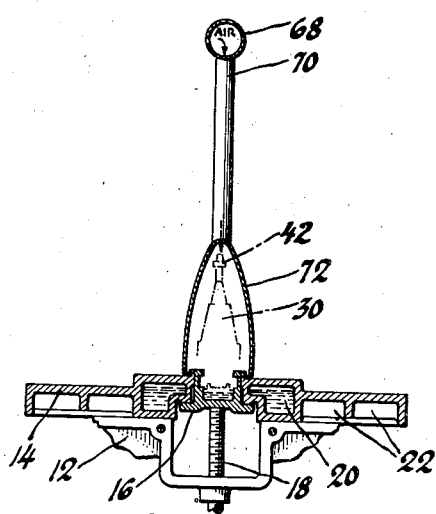
Fig. 7
Fig. 8
Inventor
Taine G. McDougal
By Blackmore, Spencer & Flint
Attorneys

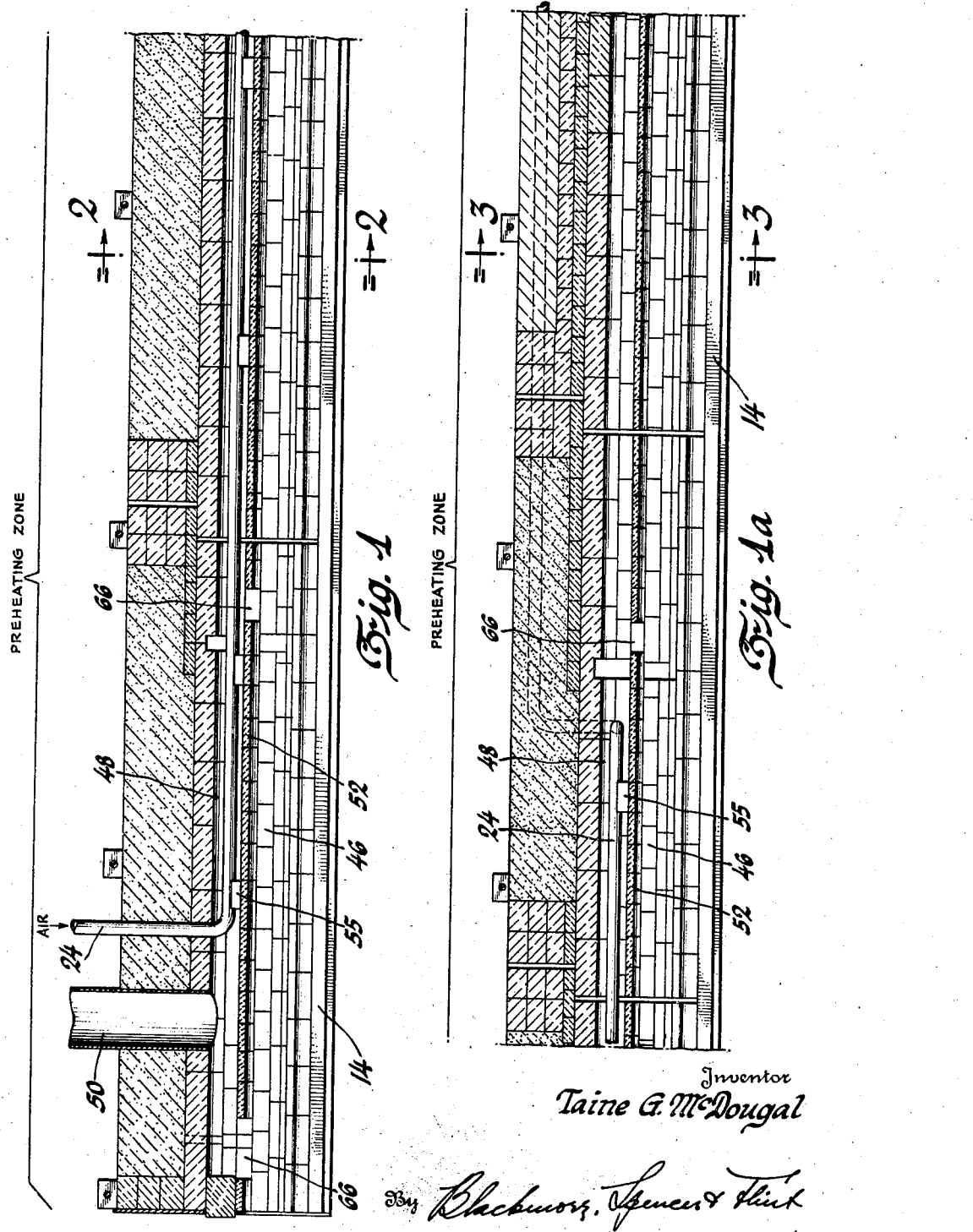

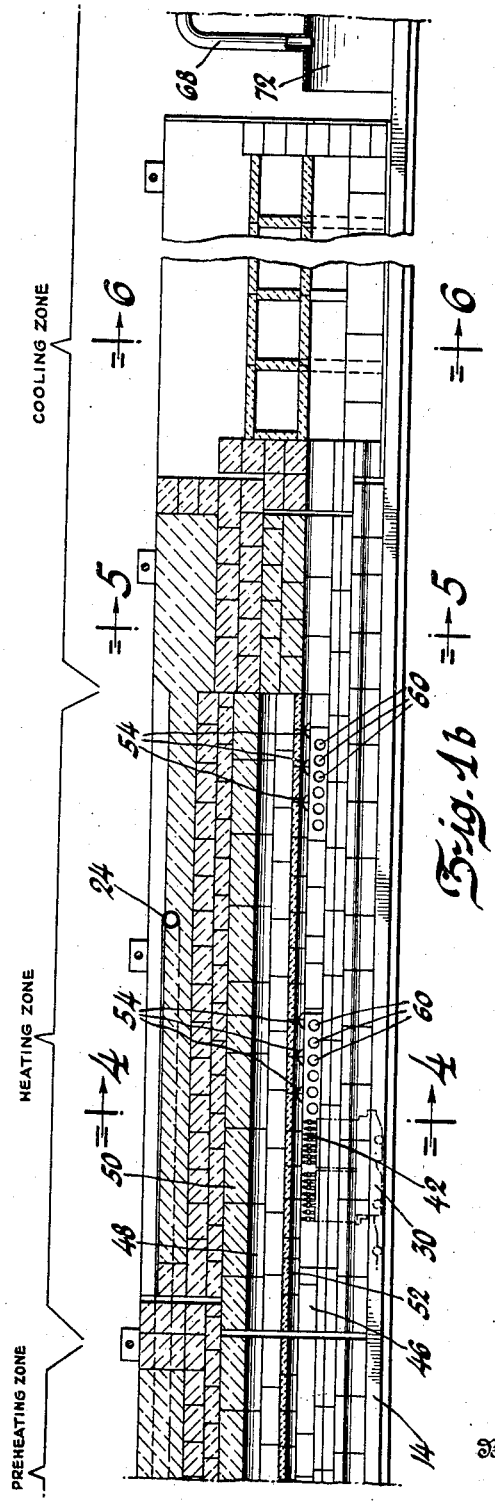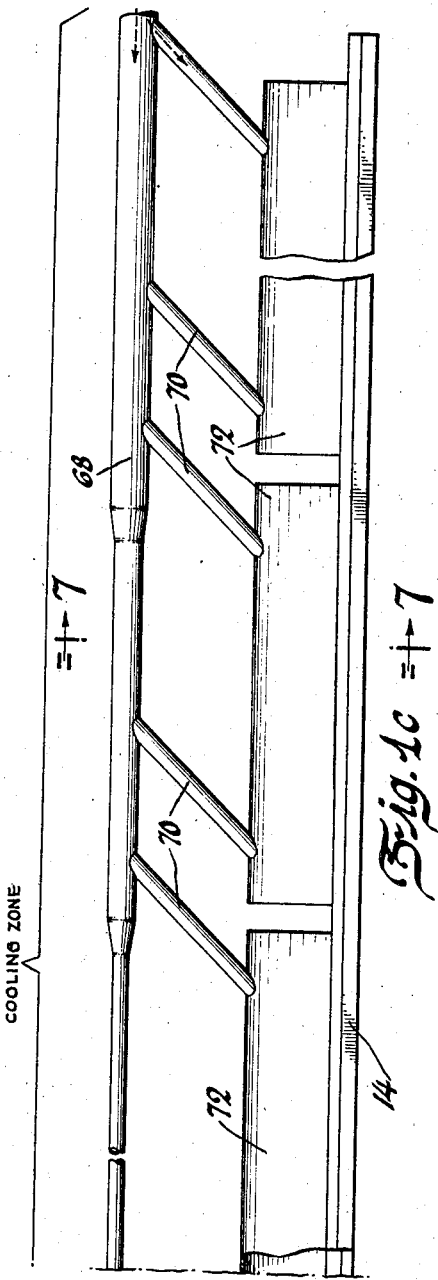

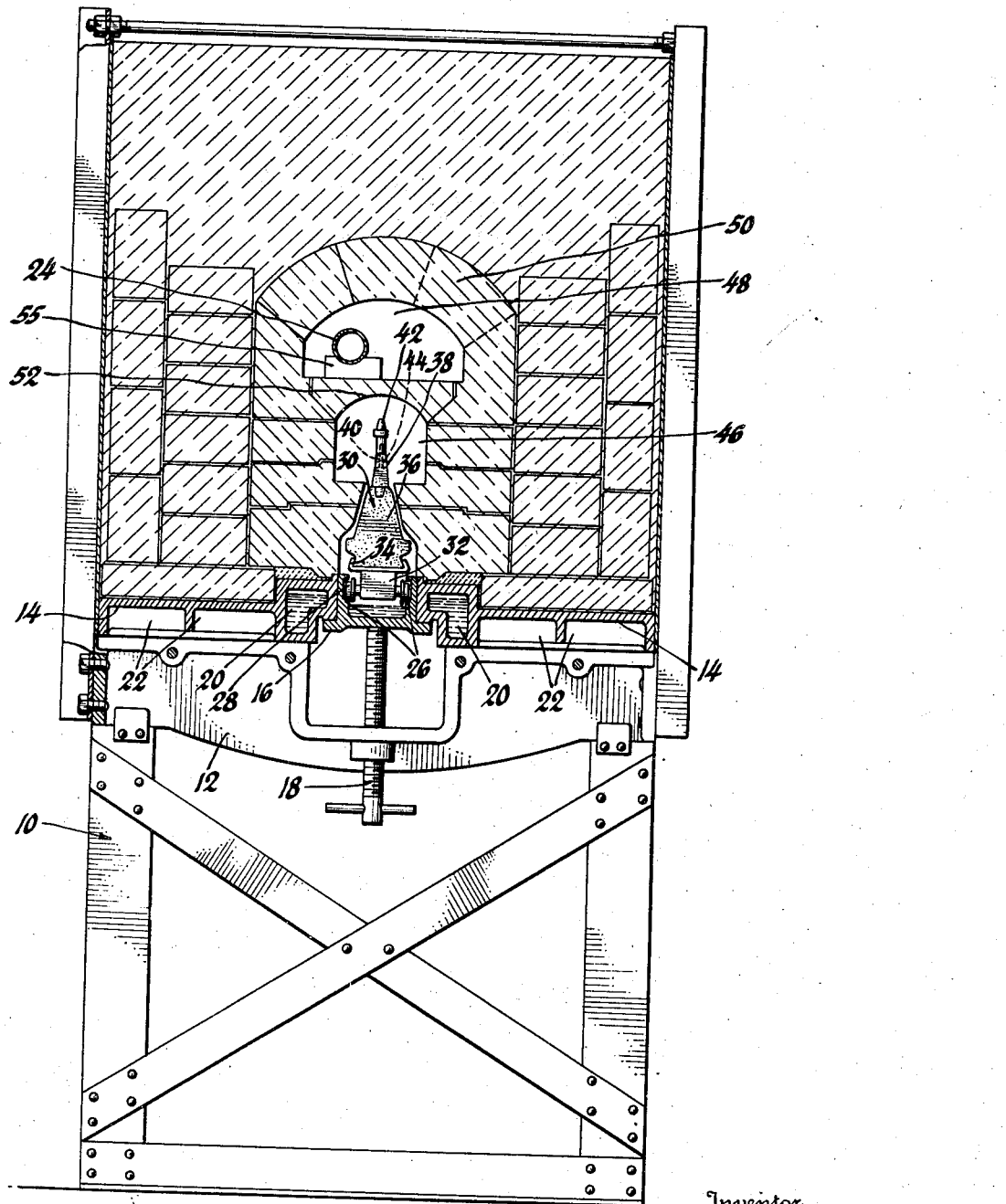

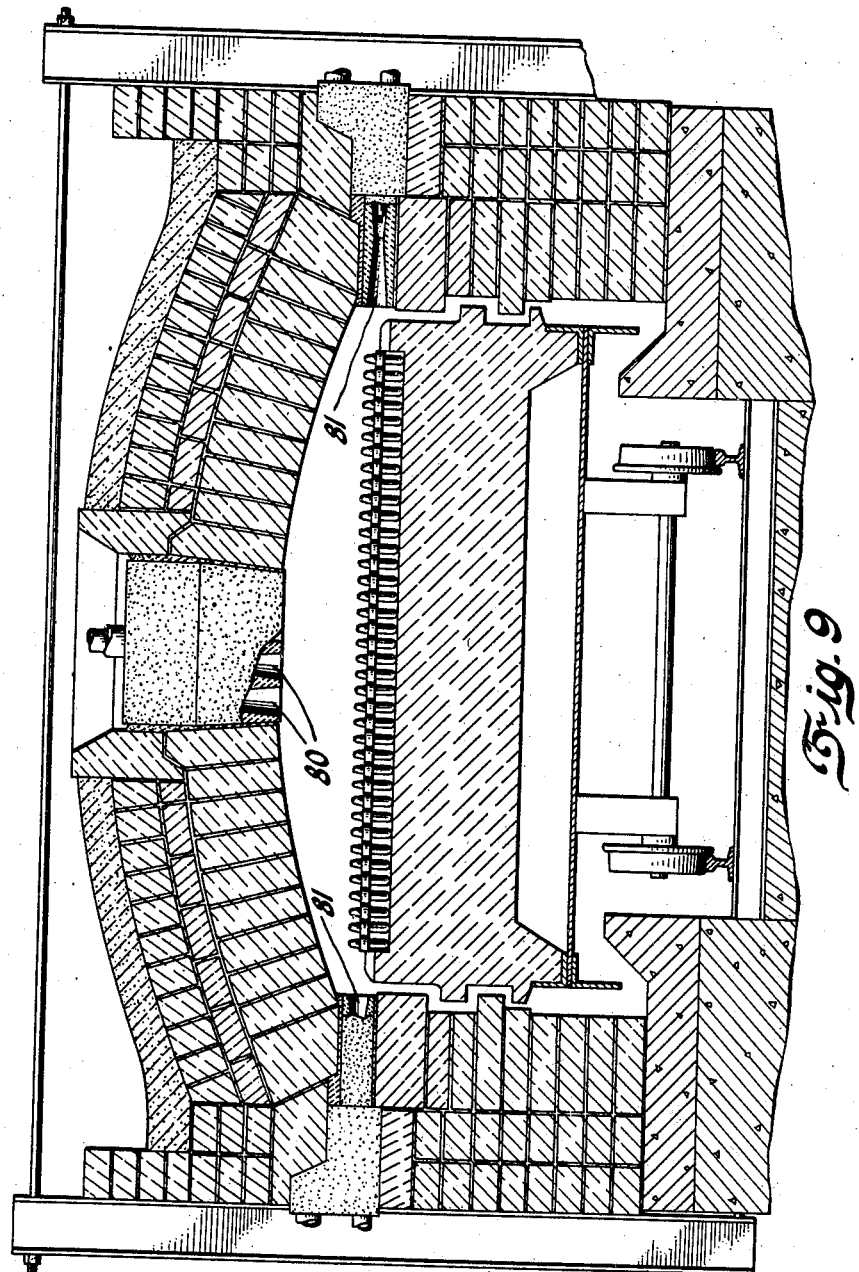

Patented Nov. 15, 1938

2,137,091

UNITED STATES PATENT OFFICE 2,137,091

TUNNEL KILN

Taine G. McDougal, Flint, Mich., assignor to General Motors Corporation, Detroit, Mich., a corporation of Delaware Application January 4, 1936, Serial No. 57,499

13 Claims. (Cl. 25—142)

This invention has to do with improvements in methods of firing ceramic ware to high temperatures, and in the construction of kilns in which the firing is done. The invention is especially applicable to kilns of the continuous or tunnel type such as are disclosed and claimed in my prior Patents No. 1,416,726, granted May 23, 1922, No. 1,713,851, granted May 21, 1929, and No. 1,713,852, granted May 21, 1929, respectively.

The principal object of the invention is to so improve methods of firing ceramic ware as to obtain higher firing temperatures with a minimum of burden on the refractories and conveyor parts and with a high degree of efficiency. This is accomplished by projecting flame directly upon the ware so that it is exposed to the maximum temperature available while the refractories and other parts are heated as by convection and radiation and somewhat by the remaining portions of the flame.

To accomplish this in a tunnel kiln the burners in the heating zone are arranged so that burning the air-fuel mixture impinges directly on the articles being fired. With this disposition it is possible to obtain temperatures at the surface of the ware substantially higher than the temperatures of the refractory walls of the kiln, thereby increasing the life of these refractories. Especially where maturing temperatures of the order of 1800° C. are desirable, the disposition herein disclosed will make such temperatures commercially attainable where otherwise their use would be substantially impracticable.

Another important feature of one variation of the kiln structure consists in the provision of a double wall for the top of the kiln of which the lower wall carries no load, save its own weight, but serves as a reflector for radiating heat onto the bodies being preheated. The lower wall or arch is provided with flues for conducting combustion gases from the hot zone to the chamber above it, which gases together with those passing underneath maintain the lower top wall at desirably higher temperatures in the preheating zone. The flues permit ready escape of burnt gases from the firing chamber, thereby facilitating combustion, and making it possible to reduce the size of the combustion chamber without correspondingly cutting down the temperatures attained.

It is also preferable to extend the double walled roof construction throughout all, or at least a substantial portion of the preheating zone, thereby providing a flue leading exhaust gases to a stack adjacent the entrance of the kiln. In order to recover some of the heat contained in the burn gases, it is preferred to provide pipes in a portion of the passage to carry air on its way to the burners, thereby raising its temperature.

Other features of the invention consist in the means for cooling the cars carrying the ware through the tunnel as well as the tracks on which they run and the supports therefor. Other details of the invention will be discussed in the course of the following description.

In the drawings:

Figures 1, 1a and 1b constitute together a longitudinal section through an improved kiln embodying the invention.

Figure 1c is a continuation of Figure 1b showing the cooling zone in side elevation.

Figure 2 is a section on line 2—2 of Figure 1 showing in addition the support for the kiln.

Figure 3 is a section on line 3—3 of Figure 1a.

Figures 4, 5 and 6 are sections on corresponding section lines of Figure 1b.

Figure 7 is a section on line 7—7 of Figure 1c.

Figure 8 is a side elevation of one of the ware carrying cars.

Figure 9 is a transverse section through the heating zone of a modified form of kiln.

The kiln shown in Figures 1 to 8, inclusive, is of the so-called miniature type described and claimed in my prior Patent No. 1,713,851. This type of kiln is designed to fire ware passed through it preferably in single file. It possesses the advantage of requiring but a short time, on the order of two hours, for the passage of ware through the kiln, and its capacity is substantially large even when compared with the much larger cross-sectional kilns which necessitate on the order of 36 to 72 hours for firing the ware.

The kiln consists of the preheating zone which comprises all of Figures 1 and 1a and the portion marked "Preheating zone" in Figure 1b; the heating zone shown at the center of Figure 1b, and the cooling zone shown at the right of Figure 1b and in Figure 1c.

The kiln is of comparatively small size, being designed especially for the firing of spark plug insulators, and for convenience in operation and repair it has been found desirable to mount it on a stand extending the full length thereof. The stand is indicated at 10 is Figure 2, and consists of suitably braced supporting members spaced along the length of the kiln. Each of the supporting members carries at its top a member 12 adapted to carry the opposed base plates 14 spaced apart to receive the track 16. The track 16 may be raised or lowered by adjusting the supporting screws 18 threaded in the members 12. The base plates 14 extend the full length of the kiln, and are preferably of channeled construction as shown. The inner channels 20 are fed preferably with cooling water at one end, while at the other end the water is permitted to flow out. The circulating water assists in cooling the track. The outer channels 22 may act as air ducts receiving air at the discharge end of the kiln, and feeding it to a suitable pump located at the entrance end of the kiln, the pump supplying the air to pipe 24 which conducts combustion air to the burners.

It will be noted that the track 16 is of U-shape, and it is provided with a fall on the order of one inch in its entire length so that water may be fed in at one end, and discharged from the other to assist in cooling the track and the cars.

The sides of the track member 16 are grooved as shown at 26 to receive the flanged wheels 28 of the cars 30. The wheels 26 are mounted on axles journaled in car frame 32. The frames, axles and wheels are preferably made of heat resisting metal, such as nickel chromium alloy. The car frames 32 are provided with flanged portions 34 adapted to receive refractory bricks 36 which, in turn, support refractories 38 carrying pins 40 on which the insulators 42 are mounted. To facilitate the insertion and removal of the pins 40 the refractories 38 are preferably provided with transverse openings 44 as shown.

The heating zone of the kiln is shown in Figures 1b and 4. Here the kiln is formed to provide two tunnels 46 and 48, one above the other. The walls of the tunnels are lined with high temperature refractory blocks, and the upper wall 50 of the tunnel 48 is in the form of an arch which supports the weight of the refractories above it. The upper wall 52 of the tunnel 46 carries its own weight only, and is provided with spaced flues 54 connecting the tunnels.

The tunnel 48 acts as a flue extending from the heating zone throughout the length of the preheating zone to the stack 50.

The pipe 24 conducting air to the burners 52 extends throughout the major portion of the length of the tunnel 48 in the preheating zone so that the air is heated by the flue gases. The pipe 24 is preferably supported on spaced blocks 55 made of suitable refractory material. The pipe 24 leaves the preheating zone at some suitable point, such as indicated at 56 in Figure 1a, and then extends along the top of the kiln, preferably embedded in the loose refractory material there provided, and conducts air to suitable manifolds 56' where it is distributed to the burners 52 as shown in Figure 4.

The burners 52' may be of any suitable type and are preferably fed with gaseous fuel. Suitable vanes may be provided to give a whirling motion to the entering fuel or air so as to insure thorough mixture. The combustible mixture is projected under pressure through a suitable orifice 60, preferably provided with a restriction or venturi, directly onto the ware 42 so that a very high temperature is maintained at the surface of the ware. No doubt "surface combustion" takes place on the ware's surface. A portion of the combustion gases passes through the flues 54 into the upper tunnel 48.

With this construction of kiln it has been found possible to obtain temperatures as much as 60° to 150° C. higher at the surface of the ware than at the walls of the tunnel so that the refractories are subjected to less burden, while at the same time the necessary higher temperatures are attained at the ware. At high firing temperatures, for example, around 1750° C, the problem of providing suitable refractories for the walls of the kiln is a difficult one, and by this method of firing the refractory problem is capable of practical solution at reasonable cost.

The burners 52' are preferably arranged in staggered groups as shown in Figures 1b and 4, a group on one side of the kiln being followed by a group on the opposite wall of the kiln so as to apply the intense heat to both sides of the insulator.

The preheating zone is characterized by the fact that the tunnel 46 extends throughout its entire length as does also the tunnel 48, except that the entrance end of tunnel 48 is closed. Flues 66 connect the tunnels at spaced points. The flue 66 nearest the entrance is of considerable size so as to afford the burnt gases passing through the tunnel 46 ready access to the stack 50.

The cooling zone is divided into, first, an indirect cooling zone made of solid masonry as shown in Figure 5; next, an air-jacketed masonry cooling zone as shown in Figure 6; and, preferably spaced from the end of the latter, a direct air cooling zone shown at the extreme right of Figure 1b and in Figure 1c. In the last named zone air is supplied through the conduit 68 to pipes 70 inclined, toward the entering ware, and the pipes 70 direct the air through the sheet metal tunnel portions 72, preferably spaced from each other and from the end of the kiln proper as shown. The air under pressure travels through the tunnel 72 in a direction opposite to the direction of feed of the ware so as to offset the tendency of the combustion gases to pass outwardly through the coling zone. At the same time the pressure should not be sufficient to force air in toward the heating zone as this would tend to reduce uneconomically the temperature in the hot zone.

In the operation of the kiln, loaded cars are introduced at the left of Figure 1, and are continuously fed through the preheating zone where the temperature is gradually raised by the direct action of flue gases traveling toward the stack through tunnel 46 and by the heat radiated from the wall 52 which is heated by the flue gases traveling through both tunnels 46 and 48. The flue gases traveling through tunnel 48 raise the temperature of the combustion air in pipes 24 to quite a high degree, preferably on the order of 400° C., and this air is delivered under pressure to the burners where it mixes with the fuel, preferably ordinary commercial gas, or butane. To insure adequate preheating of the ware, as well as of the combustion air it may be desirable to provide baffles here and there in tunnels 46 and/or 48 to control the velocity of the flue gases.

The thoroughly heated bodies then pass into the heating zone where they are subject to direct impingement of the flame from the burners, thus providing the maximum temperature of combustion at the surface of the ware. This heating is preferably effected alternately, first on one side, and then on the other, but, if desired, burners could be arranged in opposed relation to heat the two sides simultaneously. The flues 54 provide adequate scavenging insuring the highest volumetric efficiency in the combustion chamber. Actual installation temperatures as high as 1750° C. have been obtained at the surface of the ware, while the temperatures at the walls of the kiln were on the order of 150° lower.

The fired wares then pass into the cooling zone where they are successively cooled by the surrounding refractories of the indirect cooling zone, then by the cooling of the air-jacketed zone, and finally by the direct air blast in the tunnel portion 72. In some cases it may be desirable to use a water cooling zone between the air-jacketed portion of the tunnel and the direct air cooling zone, but in practice this has not been found necessary.

While the ware has thus been subjected to gradual heating, intense heating and gradual cooling, the cars, and particularly the lubricated parts, such as the journals for the wheels, have been maintained at a temperature to insure good lubrication by the cooling system consisting of water flowing through the track 16 and through the abutting water-jacketed portions of the base plates 14.

The time of the firing cycle may be very short. Thus, for maximum production when firing at temperatures on the order of 1750° C., the total time may be as little as one hour and twenty minutes.

The principal features of the invention as so far described may be applied as well to tunnel kilns in which the insulators are arranged in rows crosswise of the cars. In Figure 9 there is shown a cross-section through the hot zone of such a kiln. The principal change consists in the provision of burners 80 in the upper wall of the kiln, these burners projecting the flame directly upon the insulators, just as do the burners 81 in the side-walls. In this design of kiln it may be found desirable to employ staggered banks of burners along the side of the kiln as in the form first described.

In the kiln shown in Figure 9 the double tunnel construction has not been employed, although this may be incorporated if desired. In both this form, and in the form previously described, the provision for impingement of flame on the ware reduces the temperatures at the walls of the kiln, thereby increasing the life of the refractories, and allowing one to substantially surpass temperature limits otherwise imposed by the refractoriness of the kiln wall structure.

I claim:

1. In a tunnel kiln a firing zone comprising a tunnel, means for continuously passing ware through the tunnel, and means for projecting flame upon the ware, said last-named means being focused on the ware so that substantially all of the flame impinges on the ware, producing combustion at the surface thereof.

2. In the combination as defined in claim 1, said firing zone being provided with a tunnel above the tunnel through which the wares are transported, said tunnels having a common wall, said wall being provided with passages for conducting combustion gases from the first-named tunnel to the second-named tunnel.

3. In the combination as defined in claim 1, said firing zone being provided with a tunnel above the tunnel through which the wares are transported, said tunnels having a common wall, said wall being provided with passages at the side of the tunnels for leading combustion gases from the first-named tunnel to the second-named tunnel.

4. In a tunnel kiln a firing zone comprising a tunnel, means for continuously transporting ware through the tunnel, means in the firing zone of the tunnel for heating the ware by direct impingement of flame, a second tunnel above the first-named tunnel, the top of the first tunnel forming the bottom of the second tunnel, and flues connecting the tunnels whereby the combustion gases more effectively heat the top wall of the kiln.

5. In the combination as defined in claim 4, said flues being located at the sides of the tunnels.

6. In a tunnel kiln having a tunnel including a preheating zone, a firing zone and a cooling zone, means for continuously passing ware through the tunnel, means for heating the ware in the firing zone by direct impingement of flame, a second tunnel above the first tunnel in the preheating and firing zones, said tunnels having a common wall, and flues connecting said tunnels in the firing zone.

7. In the combination as defined in claim 6, conduits leading to said heating means arranged in said second-named tunnel for conducting heated air to the heating means.

8. In a tunnel kiln a firing zone comprising a tunnel, means for continuously transporting ware in single file through the tunnel comprising ware supporting means adapted to expose the ware on substantially all sides, means on opposite sides of the tunnel for projecting flame on the exposed sides of the ware, said means being focused on the ware so that substantially all of the flame impinges on the ware producing combustion at the surface thereof.

9. In the combination as defined in claim 8, a second tunnel above the first-named tunnel, the top of the first tunnel forming the bottom of the second tunnel, and flues connecting the tunnels at the sides thereof and arranged adjacent the flame projecting means.

10. In the combination as defined in claim 8, a second tunnel above the first-named tunnel, the top of the first tunnel forming the bottom of the second tunnel, flues connecting the tunnels at the sides thereof and arranged adjacent the flame projecting means, and conduits for leading air to the flame projecting means extending through the second-named tunnel.

11. A high temperature tunnel kiln for firing ceramic ware comprising a firing tunnel and an upper tunnel, said tunnels being separated by a comparatively thin heat transmitting and radiating partition, burners arranged in the firing tunnel so as to project flame on the ware therein producing maximum temperatures at the surface of the ware, and flues connecting said tunnels adjacent the burners to afford ready escape for the products of combustion.

12. A tunnel kiln for firing ceramic ware comprising upper and lower tunnels in the firing zone separated by a heat transmitting and radiating partition, burners in the lower tunnel arranged to project flame directly on the ware so as to produce maximum temperatures at the surface of the ware, and ports adjacent the burners through which combustion gases in the firing zone can pass from the lower tunnel to the upper tunnel.

13. A tunnel kiln according to claim 12 having a preheating zone comprising a lower tunnel for the passage of wares, and an upper tunnel with ports connecting said tunnels through which combustion gases can pass from the lower tunnel.

TAINE G. McDOUGAL.